(12) United States Patent
Allman

(10) Patent No.: US 11,078,038 B2
(45) Date of Patent: Aug. 3, 2021

(54) DETECTOR WITH TRIANGLE-SHAPED INDUCTOR COILS

(71) Applicant: Hewlett-Packard Development Company, L.P., Houston, TX (US)

(72) Inventor: Stuart Allman, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 340 days.

(21) Appl. No.: 16/095,750

(22) PCT Filed: Jul. 6, 2016

(86) PCT No.: PCT/US2016/041148
§ 371 (c)(1),
(2) Date: Oct. 23, 2018

(87) PCT Pub. No.: WO2018/009187
PCT Pub. Date: Jan. 11, 2018

(65) Prior Publication Data
US 2020/0331719 A1 Oct. 22, 2020

(51) Int. Cl.
*B65H 7/06* (2006.01)
*B65H 5/00* (2006.01)
(Continued)

(52) U.S. Cl.
CPC ............. *B65H 7/06* (2013.01); *B65H 5/00* (2013.01); *G01V 3/104* (2013.01); *B41J 11/0095* (2013.01)

(58) Field of Classification Search
CPC ... B65H 7/00; B65H 7/02; B65H 7/06; B65H 2511/521; B65H 2511/52; B65H 5/00; G01V 3/104; B41J 11/0095
See application file for complete search history.

(56) References Cited

U.S. PATENT DOCUMENTS 4,433,528 A * 2/1984 Bohman ............... G01V 3/08
340/684
5,087,027 A    2/1992 Acquaviva
(Continued)

FOREIGN PATENT DOCUMENTS

CN    102457106    5/2012
CN    103296464    9/2013
(Continued)

OTHER PUBLICATIONS

Machine translation of JP10-239920. (Year: 1998).*
HP Support Center. HP Scanjet Flatbed Scanners—Clear paper jams in the Automatic Document Feeder. Sep. 19, 2014 ~ 5 pages.

*Primary Examiner* — Thomas A Morrison
(74) *Attorney, Agent, or Firm* — Fabian VanCott

(57) ABSTRACT

A document feeder may include a media transporter to feed a number of sheets of media through a feed path and a detector to detect the presence of a metal object including a number of triangular-shaped inductor coils to detect the metal objects. A method of detecting a metal object coupled to a sheet of media entering a document processing device may include applying an alternating current to a number of triangular-shaped inductor coils to create a magnetic field upstream of a media feed path, detecting a change in a magnetic flux of the magnetic field due to a metal object in the path of said magnetic flux, and producing a warning when the changes in the magnetic flux are detected.

15 Claims, 5 Drawing Sheets

(51) Int. Cl.
    *G01V 3/10*         (2006.01)
    *B41J 11/00*      (2006.01)

(56) References Cited

U.S. PATENT DOCUMENTS

| | | | | |
|---|---|---|---|---|
| 5,752,513 A | * | 5/1998 | Acker | A61B 5/06 |
| | | | | 128/899 |
| 8,237,998 B2 | | 8/2012 | Rozenfeld et al. | |
| 2002/0079908 A1 | | 6/2002 | Hohl | |
| 2008/0246291 A1 | | 10/2008 | Tonami | |
| 2011/0156903 A1 | * | 6/2011 | Henniges | G08B 21/182 |
| | | | | 340/540 |
| 2013/0141084 A1 | | 6/2013 | Hsieh et al. | |
| 2016/0185544 A1 | | 6/2016 | Link et al. | |

FOREIGN PATENT DOCUMENTS

| | | |
|---|---|---|
| JP | 10239920 | 9/1998 |
| JP | H10239920 | 9/1998 |
| JP | 2004-040465 | 2/2004 |
| JP | 2007298300 | 11/2007 |
| JP | 2007298300 A | 11/2007 |
| JP | 2008-203240 | 9/2008 |
| JP | 2008224409 A | 9/2008 |
| JP | 2009166952 A | 7/2009 |
| JP | 2013-134227 | 7/2013 |
| JP | 2016019305 A | 2/2016 |
| RU | 2313109 C1 | 12/2007 |

\* cited by examiner

DETECTOR WITH TRIANGLE-SHAPED INDUCTOR COILS

BACKGROUND

Automatic document feeders (ADFs) in devices such as scanners, printing devices, copiers, or multifunctional devices (MFDs) receives a stack of papers and feeds each of them into the device. These document feeders feed a single page at a time through the document feeder in order to process that page as directed by the user based on the capabilities of the device.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
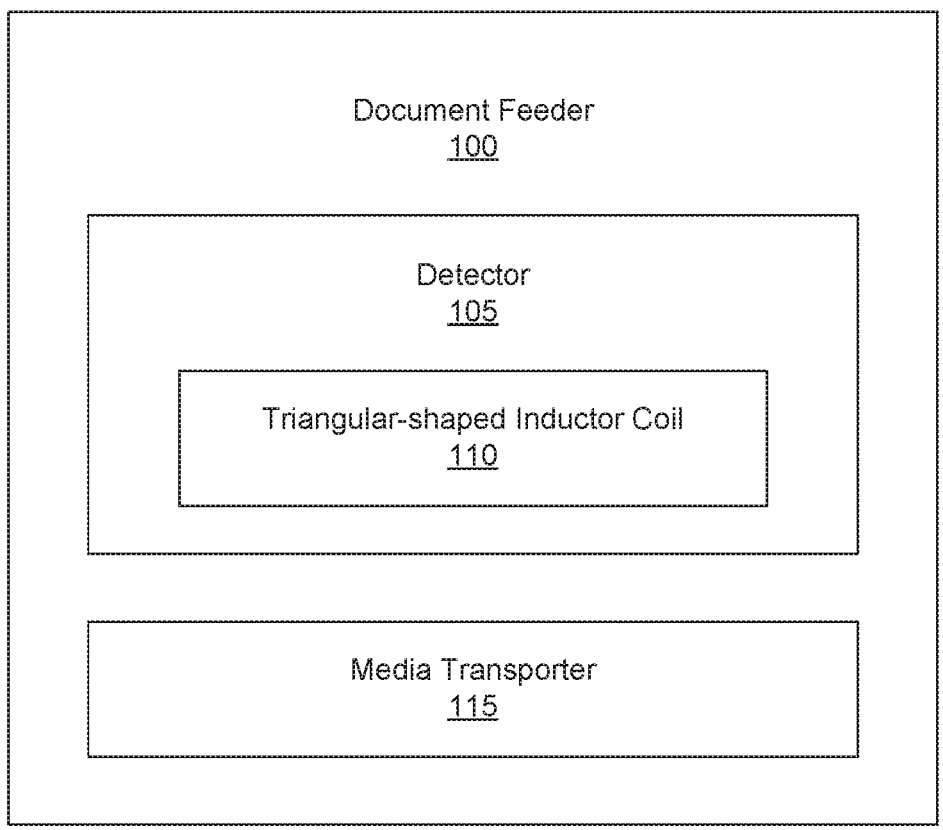
FIG. 1 is a block diagram of a document feeder according to one example of the principles described herein.

As described above, document feeders receive a stack of individual sheets of media to be processed by a device associated with the document feeder. A tray may be provided onto which the sheets of media may be stacked by a user of the processing device and document feeder. The document feeder may receive, one-at-at-time from the tray, a single page from the stack and feed it into the device for processing. The processing of the pages after these pages have been fed into a device by the document feeder depends on the type of device associated with the document feeder but may include, in one example, scanning of each of the sheets.

Occasionally, certain foreign objects may enter a feed path created by the document feeder during feeding of the sheets of media. In one example, a user may accidentally fail to remove staples, paperclips, or other fasteners in a stack of documents causing a number of sheets to be jammed into the feeding path as well as the device itself. When this happens, the device is opened to some degree and the jammed pages removed from the device. This causes degradation or even destruction of the jammed pages, damage to the document path, reduces user satisfaction, and reduces productivity.

To avoid the destruction of these pages, damage to the device and document feeder, and user dissatisfaction, the present specification describes a detector for detecting foreign objects such as metal paperclips, staples, and other fasteners before they enter a media feed path of a document feeder. The detector may include a printed circuit board (PCB) with a number of inductor coils defined thereon. The inductor coils are triangular shaped allowing for surface space optimization of the PCB as well as relatively better magnetic flux reinforcement between inductor coils than with circular inductor coils. Additionally, all angular orientations of the metal staples, paperclips, or other fasteners are detected because the direction of the magnetic field produced by the triangular-shaped inductor coils changes based on where along the PCB the fastener is as it passes by the PCB. Consequently, even if a staple, for example, was oriented parallel to the PCB, the triangular-shaped inductor coils will detect the presence of the staple some time along the width of the PCB. Detection of the staple will stop the sheet from entering the media feed path defined in the device and document feeder, warn a user of the device of the presence of a foreign object, and increase user satisfaction and device reliability.

In an example, the present specification, describes a document feeder including a media transporter to feed a number of sheets of media through a feed path and a detector to detect the presence of a metal object including a number of triangular-shaped inductor coils to detect the metal objects.

In an example, the present specification also describes a method of detecting a metal object coupled to a sheet of media entering a document processing device including applying an alternating current to a number of triangular-shaped inductor coils to create a magnetic field upstream of a media feed path, detecting a change in a magnetic flux of the magnetic field due to a metal object in the path of the magnetic flux, and producing a warning when the changes in the magnetic flux are detected.

In an example, the present specification also describes a document processing device including a feeding device to feed a number of sheets of media from a document tray and into a media feed path within the document processing device and a detector to detect foreign objects within the number of sheets of media including a printed circuit board including a number of triangular-shaped inductor coils.

As used in the present specification and in the appended claims, the term "document feeder" is meant to be understood as any device that feeds a sheet of media, one at a time, into a document processing device. In an example, the document feeder includes a pick-up roller or other media transporter to pick a next sheet of print media and introduce that sheet into the media feed path.

Additionally, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Turning now to the figures, FIG. 1 is a block diagram of a document feeder (100) according to one example of the principles described herein. The document feeder (100) may be implemented in an electronic device. The document feeder (100) may include a detector (105) for detecting foreign objects associated with sheets of print media before the sheets are introduced into a media feed path in the document feeder (100) and a media processing device. The detector (105) includes a number of triangular-shaped inductor coils (110). Each of these will now be described in more detail below.

The document feeder (100) may be utilized in any media processing device. Examples of media processing devices includes, scanners, printers, copiers, multifunction device (MFD), or any other device that may implement a document feeder (100) in order to introduce a sheet of media into a media feed path. For convenience of explanation, the document feeder (100) will be described in terms of being coupled and associated with a multifunction device (MFD) that may, at least, scan and copy a sheet of media introduced into the media feed path by the document feeder (100).

The MFD may be implemented in any data and media processing scenario including, stand-alone hardware, mobile applications, through a computing network, or combinations thereof. Further, the MFD may be used in a computing network, a public cloud network, a private cloud network, a hybrid cloud network, other forms of networks, or combinations thereof.

To achieve its desired functionality, the document feeder (100) comprises various hardware components that may cause a single sheet of media within a stack of sheets of media placed on a tray associated with the document feeder (100). In an example, the document feeder (100) may include a media transporter (115) including a pick-up roller to pull a single sheet of media from the stack and introduce the sheet into a media feed path within the document feeder (100) and connected to the MFD. In this example, the media feed path of the document feeder (100) is downstream of the detector (105) while the detector (105) is downstream of the media transporter (115): the pick-up roller not being part of the media feed path. Any number of other rollers may be included with the media transporter (115) of the document feeder (100) in order to progress a sheet of media through the document feeder (100) and through the MFD.

As a sheet of media is introduced into the media feed path, the sheet of media passes over, under, or next to a detector as described herein. The detector (105) detects the presence of foreign objects other than the media that may be inadvertently introduced into the media feed path. An example of a foreign object may include a staple, a paperclip or other metallic object used to fasten to a sheet of media or coupled a plurality of sheets of media together.

In order to achieve its functionality, the detector (105) may include any number of triangular-shaped inductor coils (110) arranged on the PCB to detect any foreign objects attached to any of the sheets of media being fed into the document feeder (100). In an example, the triangular-shaped inductor coils (110) are equilateral triangular-shaped inductor coils (110). In an example, the triangular-shaped inductor coils (110) are right triangular-shaped inductor coils (110). In an example, the triangular-shaped inductor coils (110) are scalene triangular-shaped inductor coils (110). In an example, the triangular-shaped inductor coils (110) include a number of right triangular-shaped inductor coils (110), a number of isosceles triangular-shaped inductor coils (110), and a number of equilateral triangular-shaped inductor coils (110).

The triangular-shaped inductor coils (110) may be arranged in electrical series or in electrical parallel along a length of a sheet of printed circuit board (PCB). In an example, the PCB may extend the entire length of the document feeder (100) along where a side of each sheet of media is introduced into the document feeder (100). This allows for the detector (105) and tis triangular-shaped inductor coils (110) to detect the entire surface area of each sheet of media for the foreign objects. As a result, where the foreign object is a staple, for example, the detector (105) may detect the presence of the staple regardless of where and in which orientation a user had previously stapled the sheet of media.

As described above, a detector (105) such as the detector (105) described herein is made up of a number of triangular-shaped inductor coils (110) to which an alternating current is applied. In an example, the alternating current applied to the triangular-shaped inductor coils (110) is provided by a power amplifier and/or inverter that receives a direct current and provides an alternating current to power the detector (100). In an example, the regulated power supply to a motherboard associated with the document processing device (110) and its processor may be also used to power the circuit including the triangular-shaped inductor coils (110). In an example, the DC power supply for a driver IC associated with the triangular-shaped inductor coils (110) may be 3.3 v, however the driver IC may generate its signal as a small AC current source in the range of 0-2 mA. Because the regulated power supply used to drive the motherboard and processor of the document processing device (110) is used as the source of power to the circuit associated with the triangular-shaped inductor coils (110), the total cost to produce the document processing device may be reduced.

In an example, an inductive sense integrated circuit may be used in connection with the triangular-shaped inductor coils (110). The inductive sense integrated circuit may receive an inductance change from the triangular-shaped inductor coils (110) and send appropriate metal detection signals to a processor associated with the document processing device (110).

As the alternating current is applied to each of the triangular-shaped inductor coils (110), a magnetic field is created. This magnetic field generated is resistant to change as metal objects are introduced near the triangular-shaped inductor coils (110). Where the inductive coil is brought near metal, eddy currents are induced in the staple, for example, and the apparent inductance of the triangular-shaped inductor coils (110) is lowered. This increase in the apparent inductance of the triangular-shaped inductor coils (110) may be detected and indicate to, for example, a MFD that the roller of the document feeder (100) should be stopped and a notice to the user should be presented indicating the detection of a foreign metal object such as the staple or paperclip.

The triangular-shaped inductor coils (110) described herein are designed, however, to produce the best possible detection of these foreign objects. Other coil designs such as circular coils or loop coils may not appropriately detect the foreign object. For example, where a loop coil is formed on a PCB with the length of the PCB extending across the beginning of the media feed path, a staple running perpendicular to the length of the PCB may not be detected. This is because the magnetic flux created by the magnetic field is changed slightly due to the introduction of the perpendicular staple but is not enough to be registered by the detector. This lack of sufficient change in the magnetic flux created by this loop coil is also seen with circular coils. Additionally, with circular coils, the surface area on the PCB is not efficiently used resulting in higher costs for a detector that cannot sufficiently detect a staple in the sheet of media if the staple is oriented in such a way to not cause a significant change in the magnetic flux.

In contrast, the triangular-shaped inductor coils (110) optimizes the space on the PCB. Additionally, with appropriate selection of geometrical dimensions of the triangular-shaped inductor coils (110), the magnetic flux of the magnetic field created by each of the triangular-shaped inductor coils (110) may be reinforced by neighboring triangular-shaped inductor coils (110) allowing for more uniform magnetic fields, Still further, a staple in any angular orientation respective of the PCB may be detected because the direction of the magnetic flux changes based on where along the PCB the staple is as it passes by the PCB. Thus, regardless of how a user had previously stapled the sheet of media, the triangular-shaped inductor coils (110) will detect the staple relatively easier.

Figure 2A:
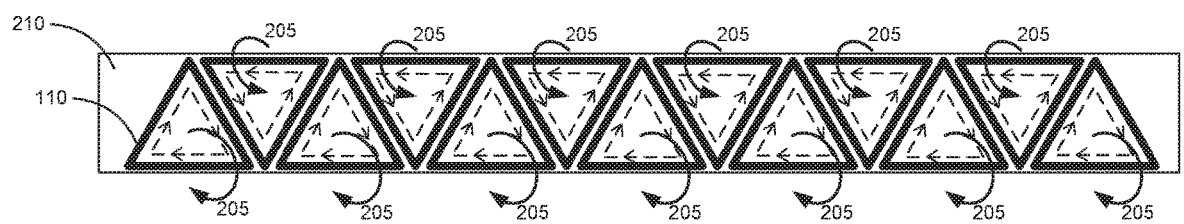
FIG. 2A is a current flow diagram of a number of triangular-shaped inductor coils according to one example of the principles described herein.

FIG. 2A is a current flow diagram of a number of triangular-shaped inductor coils (110) according to one example of the principles described herein. The current flow (indicated by dashed arrows) within each of the triangular-shaped inductor coils (110) are created based on the direction of the windings of the coil. Where the triangular-shaped inductor coils (110) as viewed in FIG. 2A are wound counterclockwise, the right-hand rule dictates that the current flow would create a magnetic field coming out of the page while the opposite is also true: triangular-shaped inductor coils (110) that are wound clockwise create a magnetic field going into the page. The direction of the windings of the coils may be alternated counter-clockwise and clockwise along the PCB (210).

By alternating the current direction in each triangular-shaped inductor coil (110), an alternating and opposite magnetic field polarity is created in each neighboring triangular-shaped inductor coil (110). The solid lines (205) indicate how a number of the triangular-shaped inductor coils (110) have a magnetic field leaving the top of the PCB (210) (north) while other triangular-shaped inductor coils (110) have a magnetic field entering the top side of the PCB (210) (south). Because each set of triangular-shaped inductor coils (110) physically dominates an edge of the PCB (210), that particular edge of the PCB (210) has a dominant magnetic field polarity. As can be seen in FIG. 2A, a magnetic "south" field dominates first longitudinal edge of the PCB (210) while a magnetic "north" field dominates the second longitudinal edge of the PCB (210). As a metal object passes by the PCB (210) in a parallel orientation with respect to the PCB (210), it is detected using a maximum magnetic field because the field lines are predominantly perpendicular to the staple.

Figure 2B:
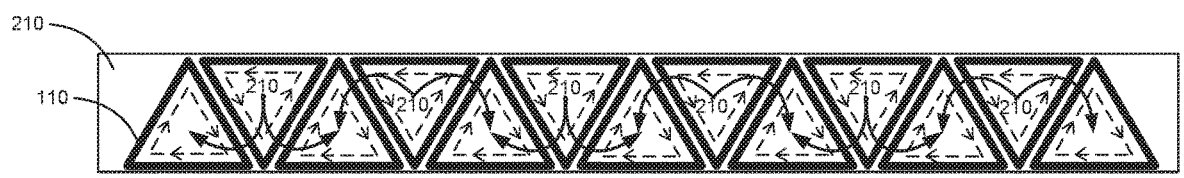
FIG. 2B is a magnetic field diagram of a number of triangular-shaped inductor coils according to one example of the principles described herein.

As can be seen in FIG. 2B, the magnetic field at the longitudinal center of the PCB (210) has an alternating magnetic polarity. FIG. 2B is a magnetic field diagram of a number of triangular-shaped inductor coils (110) according to one example of the principles described herein. Because of the alternating polarity of the magnetic field, the field lines (215) in the center of the board are oriented at close to 0 degrees relative to the longitudinal axis of the PCB. This results in a magnetic field that will be used to optimally detect a staple, for example, in a 90-degree orientation relative to the PCB (210). Additionally, because the magnetic field alternates between neighboring triangular-shaped inductor coils (110), the magnetic flux of the magnetic field created by each of the triangular-shaped inductor coils (110) is reinforced by each of its neighboring triangular-shaped inductor coils (110). In this example, the magnetic field alternates among the neighboring triangular-shaped inductor coils (110) because of the direction the coils are wound. Here, a counterclockwise-wound triangular-shaped inductor coil (110) has a magnetic field coming out of the page as seen in FIG. 2B. Accordingly, a clockwise-wound triangular-shaped inductor coil (110) has a magnetic field going into the page as seen in FIG. 2B. Because the triangular-shaped inductor coils (110) are connected in series either through the PCB (210) or between neighboring coils, the current may flow through each of the neighboring triangular-shaped inductor coils (110) but be wound in alternating and opposite directions causing the alternating and opposite "polarities" of the magnetic field. As described above, this allows for a reinforced magnetic flux of the magnetic fields between any two neighboring triangular-shaped inductor coils (110) creating a larger magnetic flux between them. Additionally, because the flux lines change direction depending on where the staple is exactly as is passes by the PCB (210) the detector (FIG. 1, 105) can better detect metal at various angles relatively better than the alternative inductor coil geometries described above. Thus, if the staple or other metal object is more oriented toward 0-degrees relative to the PCB (210) it will be better detected the staple at the edge of the PCB (210). If the staple is more oriented toward 90-degrees relative to the PCB (210) the staple will be better detected at the center of the PCB (210). The two detection angles complement each other and provide relatively better angular coverage.

Simulations were conducted to determine how a staple of different metals and at differing degrees relative to the PCB (210) would be detected by the detector (FIG. 1, 105) and the triangular-shaped inductor coils (110). Table 1 shows the simulated results:

TABLE 1

| Layers | Turns/Layer | Dielectric (mils) | Trace Width (mils) | Copper (oz) | No Staple (uH) | Staple 0° (uH) | Staple 90° (uH) |
| --- | --- | --- | --- | --- | --- | --- | --- |
| 4 | | 4.5 | 14 | 2 | 39.521 | 39.502 Δ0.019 | 39.505 Δ0.016 |

As can be seen in the results shown in Table 1, for inductance change the 0-degree orientation the staple is almost the same as the 90-degree orientation. Although the change in inductance with regard to the 90-degree orientation of the staple may not be exactly as high as the 0-degree orientation of the staple, these results are sufficient enough to be detected regardless of the orientation of the staple.

Figure 3:
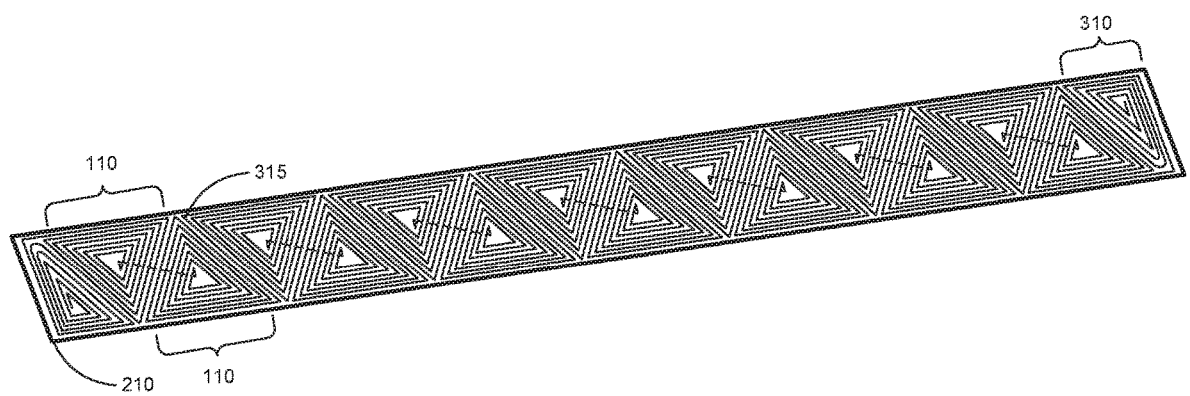
FIG. 3 is a top isometric view of the PCB and triangular-shaped inductor coils according to an example of the principles described herein.

A number of example arrangements of the triangular-shaped inductor coils (110) on the PCB (210) are contemplated in the present description. One of these examples is represented in FIG. 3. FIG. 3 is a top isometric view of the PCB (210) and triangular-shaped inductor coils (110) according to an example of the principles described herein. In the example shown in FIG. 3, the triangular-shaped inductor coils (110) are generally equilateral triangular-shaped inductor coils (110) with the exception of the end triangular-shaped inductor coils (310). The end triangular-shaped inductor coils (310) are generally right triangular-shaped inductor coils (310). The end triangular-shaped inductor coils (310) use up that portion of the PCB (210) that could not be used by an equilateral triangular-shaped inductor coil (210).

As can be seen in FIG. 3, a pair of triangular-shaped inductor coils (210) may be electrically coupled to one another via an inductor coil wire (315). Thus, a wire may connect each adjacent triangular-shaped inductor coils (310) to one another. In an example, this wire (315) forms the outermost wrap within each of the pair triangular-shaped inductor coils (210). In an example, the triangular-shaped inductor coils (310) include a wire (315) that connects each neighboring triangular-shaped inductor coils (310) between centers of each triangular-shaped inductor coils (310). As alternating current is passed through each of the pair of triangular-shaped inductor coils (210) the two opposite magnetic fields are created as described above. This is because the wire (315) connects a counterclockwise wrapped coil with a clockwise wrapped coil.

Although not seen in FIG. 3 except as dashed lines, each pair of triangular-shaped inductor coils (210) is further coupled to another pair of triangular-shaped inductor coils (210) via an electrical connection formed within the PCB (210). These electrical connections are formed during the formation of the PCB (210). The two end triangular-shaped inductor coils (210) may be electrically coupled to opposite poles of an alternating electrical source completing the circuit.

The circuit described above may further comprise a capacitor, of a predetermined value, to prevent false detection of non-metallic object. In this example, the detector (FIG. 1, 105) design is made up of both the triangular-shaped inductor coils (110) formed on the PCB (FIGS. 2A and B, 210), as previously described, as well as a fixed value capacitor. Through discovery, it was found that the PCB (FIGS. 2A and B, 210) inductance and capacitor value have a direct influence on false detection of metallic objects. A non-metallic object such as the media itself placed near the PCB (FIGS. 2A and B, 210) and triangular-shaped inductor coils (110) may create a parasitic capacitance. This parasitic capacitance may change the tuning of an inductor-capacitor pair within the circuit. If the tuned circuit uses a sufficiently large capacitor, however, then the parasitic capacitance change is de minimis. Thus, in an example, a 1.5 nF capacitor electrically coupled to the triangular-shaped inductor coils (110) in the PCB (FIGS. 2A and B, 210) causes the detector (FIG. 1, 105) to detect metal objects while ignoring other non-metallic objects. In an example, the capacitance of the capacitor may be 1 nF or higher. However, in other examples this value may be lower than 1 nF depending on the media supported by a document feeder (FIG. 1, 100).

Figure 4:
FIG. 4 is an isometric view of a document processing device implementing the detector according to one example of the principles described herein.

The detector (FIG. 1, 105) described above with its PCB (FIGS. 2A and B, 210) and mounted triangular-shaped inductor coils (110) may be implemented in any document processing device that uses an automatic document feeder (ADF) to processes the media described herein. FIG. 4 is an isometric view of a document processing device (400) implementing the detector (405) according to one example of the principles described herein. The document processing device (400) may be any document processing device (400) that can, at least, receive a sheet of media via an ADF and scan the image thereon for further processing such as making copies or providing a .pdf file to a networked computing device.

The document processing device (400) may include a feeding device (405) such as an ADF to feed a number of sheets of media from a document tray and into a media feed path within the document processing device (400). As described above, the feeding device (405) may include any number of subcomponents such as rollers to conduct a single sheet of media from the stack placed on the tray and into the media feed path of the feeding device (405) and document processing device (400).

The document processing device (400) may further include a detector (410) to detect foreign objects, such as metal objects, within the number of sheets of media. As described above, the detector (410) comprises a number of triangular-shaped inductor coils (FIG. 3, 110) coupled to a PCB (FIGS. 2A and B, 210). In an example, the detector may be positioned in any location where the surface of a single sheet that is to be introduced into the media feed path can be monitored for metallic objects such as a staple. In an example, the document processing device (400) receives a signal from the detector (410) when a foreign object is detected. Upon receipt of this signal, a processor (not shown) associated with the document processing device may direct the feeding device (405) to stop pulling in the sheet of media. Additionally, in an example, the processor of the document processing device (400) may provide an alert to a user of the document processing device (400) that a foreign object has been detected or that the document processing device (400) is otherwise in operable and that the user is to address the issue. In an example, the alert is provided to a user via a user interface (415) such as a screen on the document processing device (400). Along with a visual alert on the screen (415), an audible alert may also be provided to direct the user to the document processing device (400) in order to address the alert notification.

Figure 5:
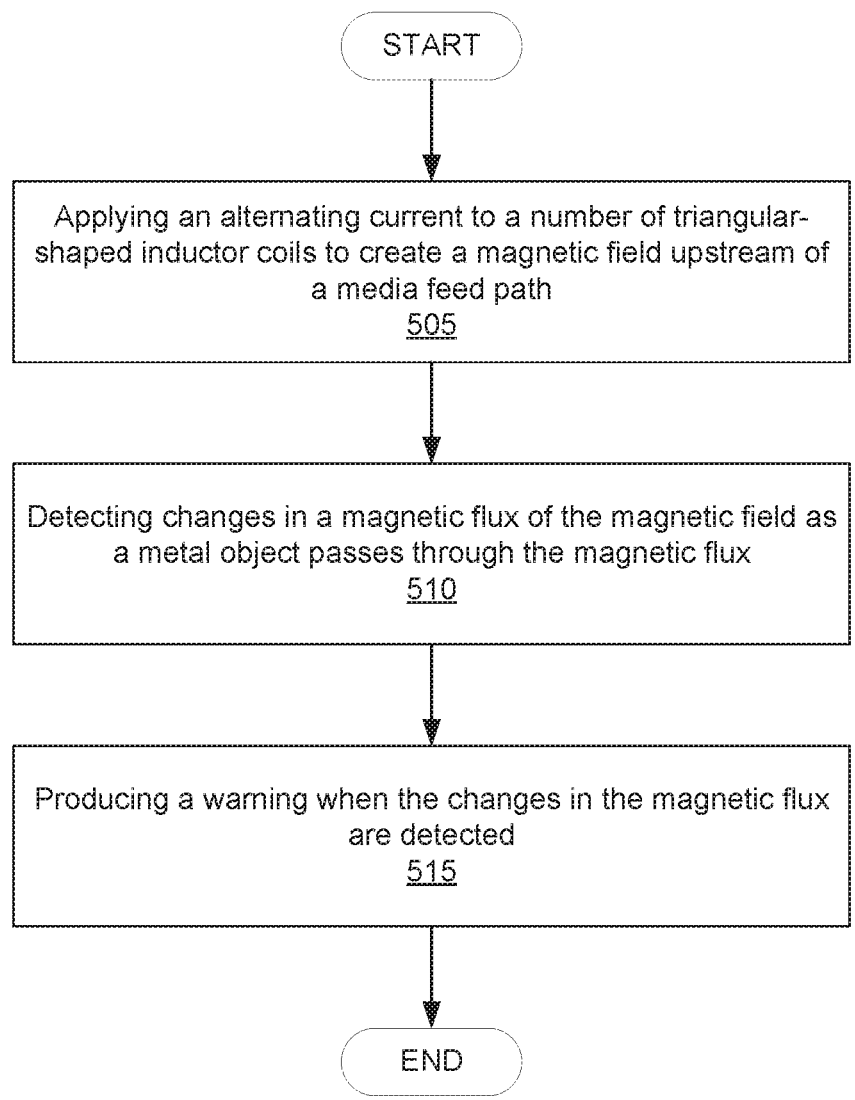
FIG. 5 is a flowchart showing a method of detecting a metal object coupled to a sheet of media entering a document processing device according to one example of the principles described herein.

FIG. 5 is a flowchart showing a method (500) of detecting a metal object coupled to a sheet of media entering a document processing device (FIG. 4, 400) according to one example of the principles described herein. The method (500) may begin by applying (505) an alternating current to a number of triangular-shaped inductor coils (FIG. 3, 110) to create a magnetic field upstream of a media feed path. As descried above, the media feed path may consist of both a media feed path defined within an ADF and a document processing device (FIG. 4, 400). In an example, the application (505) of alternating current to the triangular-shaped inductor coils (FIG. 3, 110) may be initiated when the document processing device (FIG. 4, 400) initiates a media feed process to feed a number of sheets of media stacked onto a tray associated with the document processing device (FIG. 4, 400).

The method (500) may continue by detecting (510) changes in the magnetic flux of the magnetic field as a metal object passes through said magnetic field. As described above, these changes are produced when a metal object changes the magnetic flux of the magnetic field produced by the triangular-shaped inductor coils (FIG. 3, 110). In an example, this change in inductance may be detected by an inductive sense circuit electrically coupled to the circuit produced by the triangular-shaped inductor coils (FIG. 3, 110) and capacitor described herein.

The method (500) may continue by producing (515) a warning when the changes in the magnetic field are detected. Again, this warning or alert may be provided in the form of a visual and/or audible cue that a user of the document processing device (FIG. 4, 400) may see and/or hear. In addition to the warning, the document processing device (FIG. 4, 400) may stop all movement of sheets of media from entering into a media feed path on a ADF.

The processor described herein associated with the detector (FIG. 1, 105) and document processing device (FIG. 4, 400) may include the hardware architecture to retrieve executable code from a data storage device and execute the executable code. The executable code may, when executed by the processor, causes the processor to implement at least the functionality of detecting a metal object coupled to a sheet of media in a document processing device according to the methods of the present specification described herein. In the course of executing code, the processor may receive input from and provide output to a number of the remaining hardware units. The data storage device associated with the processor may store data such as executable program code that is executed by the processor or other processing device.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor of the document processing device (FIG. 4, 400) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a document processing device and document feeder including a detector (FIG. 1, 105) having a number of triangular-shaped inductor coils (FIG. 3, 110) as well as a method of detecting a metal object coupled to a sheet of media that is to enter a document feed path of the document processing device (FIG. 4, 400) and/or document feeder. This detector with triangle-shaped inductor coils may provide for a coil geometry that utilizes the most space on the PCB while still detecting metal objects such as staples and paperclips at arbitrary orientations with respect to the PCB. Additionally, because the PCB is oriented along the width of the feed path into the ADF, metal objects coupled to the sheets of print media may be detected, With the above described inductance and capacitance values, the detector may avoid any false-positive detection of foreign objects entering the media feed path. Further, the size of the PCB and triangular-shaped inductor coils is such that it may relatively easily fit into existing housing of a document processing device with little to no alterations to the design of the document processing device. As described above, the triangular shape of the triangular-shaped inductor coils allows a generated magnetic field between neighboring triangular-shaped inductor coils to work together producing a relatively stronger magnetic flux than was possible with other geometric induction coil designs.

The preceding description has been presented to illustrate and describe examples of the principles described. This description is not intended to be exhaustive or to limit these principles to any precise form disclosed. Many modifications and variations are possible in light of the above teaching.

What is claimed is:

1. A document feeder, comprising:
a media transporter to feed a number of sheets of media through a feed path; and
a detector to detect the presence of a metal object comprising:
a plurality of triangular-shaped inductor coils to detect the metal object aligned along a printed circuit board (PCB) in alternating orientations, wherein each of the plurality of triangular-shaped inductor coils is an equilateral triangular-shaped inductor coil and wherein any surface area on the PCB not covered with an equilateral triangular-shaped inductor coil is covered with a non-equilateral triangular-shaped inductor coil.

2. The document feeder of claim 1, wherein the plurality of triangular-shaped inductor coils is electrically coupled together in series to span across a width of an inlet of the media transporter.

3. The document feeder of claim 1, wherein the detector further comprises a capacitor having a capacitive value sufficiently large to ignore parasitic capacitance changes across the detector due to the sheets of media.

4. The document feeder of claim 1, wherein the plurality of triangular-shaped inductor coils are aligned along the printed circuit board (PCB) in alternating orientations with at least one side of each triangular-shaped inductor coil running parallel with a side of a neighboring triangular-shaped inductor coil.

5. The document feeder of claim 4, wherein the PCB is rectangular in shape.

6. A document processing device, comprising:
a feeding device to feed a number of sheets of media from a document tray and into a media feed path within the document processing device; and
a detector to detect foreign objects within the number of sheets of media, comprising:
a printed circuit board (PCB) comprising a plurality of equilateral triangular-shaped inductor coils and a plurality of non-equilateral-shaped inductor coils, wherein any surface area on the PCB not covered with an equilateral triangular-shaped inductor coil is covered with a non-equilateral triangular-shaped inductor coil.

7. The document processing device of claim 6, wherein the equilateral triangular-shaped inductor coils are electrically coupled to a capacitor having a capacitance sufficient to disregard the presence of the sheets of media across the equilateral triangular-shaped inductor coils.

8. The document processing device of claim 7, wherein power is provided to a circuit from a power supply of a scan system associated with the document processing device.

9. The document processing device of claim 7, wherein a magnetic field polarity of each of the equilateral triangular-shaped inductor coils alternates along the PCB.

10. The document processing device of claim 6, wherein the foreign objects are metal objects and the detector detects the presence of the metal objects coupling a plurality of the number of sheets of media prior to a first of the plurality of sheets of media entering the media feed path.

11. The document processing device of claim 10, further comprising a user interface to provide a warning to a user when the metal objects are detected prior to the first sheet of media entering the media feed path.

12. The document processing device of claim 6, wherein the PCB is integrated into a document feeder tray along the media feed path within the feeding device.

13. A method of detecting a metal object coupled to a sheet of media entering a document processing device, comprising:
applying an alternating current to a plurality of equilateral triangular-shaped inductor coils to create a magnetic field, wherein the plurality of equilateral triangular-shaped inductor coils are situated on a printed circuit board (PCB) further comprising a plurality of non-equilateral triangular shaped inductor coils, wherein any surface area on the PCB not covered with an equilateral triangular-shaped inductor coil is covered with a non-equilateral triangular-shaped inductor coil;

detecting changes in a magnetic flux of the magnetic field as a metal object passes through the magnetic flux; and producing a warning when the changes in the magnetic flux are detected.

14. The method of claim 13, wherein the warning is presented to a user via a user interface associated with the document processing device.

15. The method of claim 13, wherein the pluralities of equilateral and non-equilateral triangular-shaped inductor coils are coupled to:

a capacitor; and a processor to further detect and recognize parasitic capacitance changes indicative of non-metallic objects.

* * * * *